(12) United States Patent
Lo

(10) Patent No.: US 7,599,391 B1
(45) Date of Patent: Oct. 6, 2009

(54) MEDIA AND SPEED INDEPENDENT INTERFACE

(75) Inventor: William Lo, Cupertino, CA (US)

(73) Assignee: Marvell International Ltd., Hamilton (BM)

(*) Notice: Subject to any disclaimer, the term of this patent is extended or adjusted under 35 U.S.C. 154(b) by 603 days.

(21) Appl. No.: 11/114,842

(22) Filed: Apr. 26, 2005

Related U.S. Application Data

(60) Provisional application No. 60/640,529, filed on Dec. 30, 2004.

(51) Int. Cl.
*H04L 12/50* (2006.01)
(52) U.S. Cl. .................... 370/465; 370/235
(58) Field of Classification Search ........... 370/230, 370/235, 232, 359, 360, 401, 402, 419, 420, 370/465, 468, 469, 471, 505
See application file for complete search history.

(56) References Cited

U.S. PATENT DOCUMENTS

| | | | |
|---|---|---|---|
| 7,020,729 B2 * | 3/2006 | Taborek et al. | 710/305 |
| 7,356,047 B1 * | 4/2008 | Mahalawat et al. | 370/469 |
| 7,373,526 B2 | 5/2008 | Hwang et al. | |
| 7,376,146 B2 | 5/2008 | Beverly et al. | |
| 7,394,825 B2 | 7/2008 | Kim et al. | |
| 2004/0264961 A1 | 12/2004 | Nam et al. | |
| 2005/0102419 A1 * | 5/2005 | Popescu et al. | 709/238 |

OTHER PUBLICATIONS

IEEE Standard for Information technology—Telecommunications and information exchange between systems—Local and metropolitan area networks—Specific requirements—Part 3: Carrier Sense Multiple Access with Collision Detection (CSMA/CD) Access Method and Physical Layer Specification, Amendment Media Access Control (MAC) Parameters, Physical Layers, and Management Parameters for 10 Gb/s Operation, IEEE Std 802.3ae-2002 Section 44 pp. 153-156; IEEE Std 802.3ea-2002 Section 47 pp. 271-283; IEEE Std 802.3ae-2002 Section 46 pp. 247-262.
IEEE Std. 802.3-2002 Section Three—35. Reconciliation Sublayer (RS) and Gigabit Media Independent Interface (GMII) pp. 5-31; IEEE Std 802.3-2002 Section Two—22. Reconciliation Sublayer (RS) and Media Independent Interface (MII) pp. 9-49.
Altera Corporation, Stratix Device Handbook, vol. 2, Chapter 8. Implementing 10-Gigabit Ethernet Using Stratix Devices, Sep. 2004, pp. 8-1 through 8-24.
Hansel A. Collins and Ronald E. Nikel, TriCN Associates, LLC, DDR-SDRAM, High-Speed, Source-Synchronous Interfaces Create Design Challenges, Sep. 2, 1999, pp. 63-72.

* cited by examiner

*Primary Examiner*—Brenda Pham

(57) ABSTRACT

A rate adaptation layer (RAL) module for converting from a first interface operating at a first rate to a second interface operating at a second rate comprises first and second input/output (I/O) modules that communicate with the first and second interfaces, respectively. A repeater module receives symbols from the first I/O module, and transmits the symbols n times to the second I/O module, where n is determined by the first and second rates. A pull-down module receives symbols from the second I/O module and selectively extracts symbols to be communicated to the first I/O module.

21 Claims, 5 Drawing Sheets

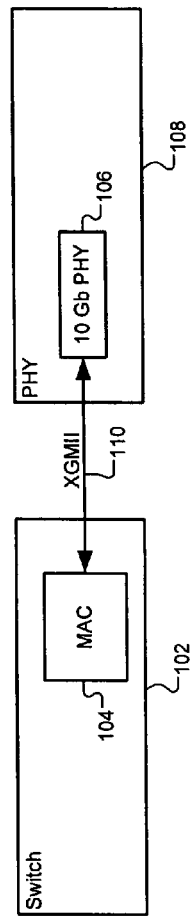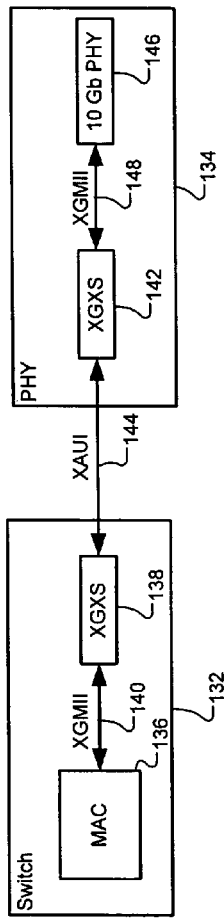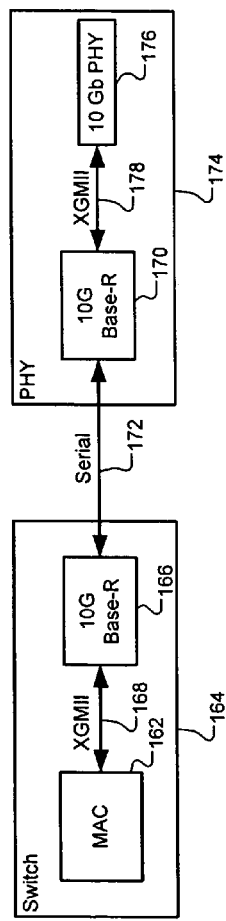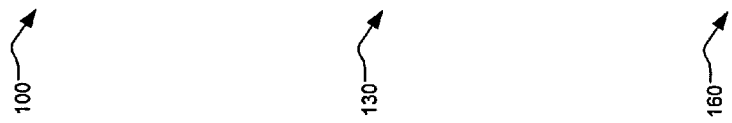

| EXGMII Pin | PHY | XGMII Usage | GMII Usage | MII Usage | Alternative MII Usage |
|---|---|---|---|---|---|
| TX_CLK | Input | TX_CLK | GTX_CLK | Unused - Set Low | TX_CLK |
| TXC[0] | Input | TXC[0] | TX_EN | TX_EN | TX_EN |
| TXC[1] | Input | TXC[1] | TX_ER | TX_ER | TX_ER |
| TXC[3:2] | Input | TXC[3:2] | Unused - Set Low | Unused - Set Low | Unused - Set Low |
| TXD[3:0] | Input | TXD[3:0] | TXD[3:0] | TXD[3:0] | TXD[3:0] |
| TXD[7:4] | Input | TXD[7:4] | TXD[7:4] | Unused - Set Low | Unused - Set Low |
| TXD[31:8] | Input | TXD[31:8] | Unused - Set Low | Unused - Set Low | Unused - Set Low |
| RX_CLK | Output | RX_CLK | RX_CLK | RX_CLK | RX_CLK |
| RXC[0] | Output | RXC[0] | RX_DV | RX_DV | RX_DV |
| RXC[1] | Output | RXC[1] | RX_ER | RX_ER | RX_ER |
| RXC[2] | Output | RXC[2] | CRS | CRS | CRS |
| RXC[3] | Output | RXC[3] | COL | COL | COL |
| RXD[3:0] | Output | RXD[3:0] | RXD[3:0] | RXD[3:0] | RXD[3:0] |
| RXD[7:4] | Output | RXD[7:4] | RXD[7:4] | Unused - Output Low | Unused - Output Low |
| RXD[8] | Output | RXD[8] | Unused - Output Low | TX_CLK | Unused - Output Low |
| RXD[31:9] | Output | RXD[31:9] | Unused - Output Low | Unused - Output Low | Unused - Output Low |

*FIG. 4*

MEDIA AND SPEED INDEPENDENT INTERFACE

CROSS-REFERENCE TO RELATED APPLICATIONS

This application claims the benefit of U.S. Provisional Application No. 60/640,529, filed on Dec. 30, 2004. The disclosure of the above application is incorporated herein by reference in its entirety.

FIELD OF THE INVENTION

The present invention relates to transmitting network data.

BACKGROUND OF THE INVENTION

Referring now to FIG. 1, a block diagram of a system 100 employing a 10 Gbps media independent interface (XGMII) according to the prior art is depicted. A switch 102 contains a media access controller (MAC) 104. The MAC 104 communicates with a 10 Gbps physical layer device (PHY) 106 within a PHY module 108 via an XGMII connection 110. The terms MAC, PHY, and many others are explained in IEEE Standard 802.3ae (30 Aug. 2002), which is incorporated herein by reference in its entirety. The XGMII is a simple and easy to implement interconnection between the switch 102 and the PHY module 108, but it only supports a very limited connection distance between the switch 102 and PHY module 108. As such, a repeater layer that can extend the reach of XGMII was developed.

Referring now to FIG. 2, a system 130 according to the prior art contains a switch 132 and a PHY module 134. Within the switch 132, a MAC 136 communicates with a first XGMII extender sublayer (XGXS) module 138 via an XGMII link 140. The first XGXS module 138 communicates with a second XGXS module 142 via a 10 Gbps attachment unit interface (XAUI). The second XGXS module 142 communicates with a 10 Gbps PHY 146 via a second XGMII link 148. XAUI allows the switch 132 and PHY 134 to have a connection distance in the tens of inches, as compared to a limit of approximately 3 inches for an XGMII link (as in FIG. 1). The XGXS modules, 138 and 142, translate between XGMII and XAUI. This allows the design of the MAC 136 and the PHY 146 to remain unchanged while still achieving the extended reach of XAUI.

SUMMARY OF THE INVENTION

A rate adaptation layer (RAL) module for converting from a first interface operating at a first rate to a second interface operating at a second rate comprises first and second input/output (I/O) modules that communicate with the first and second interfaces, respectively. A repeater module receives symbols from the first I/O module and transmits the symbols n times to the second I/O module, where n is determined by the first and second rates. A pull-down module receives symbols from the second I/O module and selectively extracts symbols to be communicated to the first I/O module.

In other features, the second rate is greater than or equal to the first rate. The first rate is one of 10 Mbps, 100 Mbps, 1 Gbps, and 10 Gbps. The second rate is 10 Gbps. The repeater module stripes repeated symbols across four lanes. The repeater module begins striping symbols in one of the four lanes. A delimiter injection module communicates a start symbol to the second I/O module to indicate a packet beginning and a terminate symbol to the second I/O module to indicate a packet ending. The second I/O module communicates data symbols and the start and terminate symbols to the second interface. The delimiter injection module replaces a data symbol communicated from the repeater module to the second I/O module with the start symbol. The repeater module stripes repeated symbols across four lanes. At least one of the four lanes are selectively deactivated. Three of the four lanes are selectively deactivated.

In other features, the at least one of the four lanes are deactivated when the first rate is less than the second rate. The delimiter injection module selectively inserts idle symbols before the terminate symbol to align the terminate and start symbols on the same one of the four lanes. A carrier extend substitution module selectively replaces symbols received from the first I/O module before they are passed to the repeater module. The carrier extend substitution module replaces a carrier extend symbol with an idle symbol and a carrier extend/error symbol with a symbol error. n is equal to the second rate divided by the first rate.

In other features, a nibble replicator module selectively replaces each four-bit nibble received from the first I/O module with a byte comprising two copies of the nibble, before passing the byte to the repeater module. The nibble replicator module is enabled when the first rate is equal to one of 10 Mbps and 100 Mbps. n is equal to the second rate divided by twice the first rate when the nibble replicator module is enabled, and equal to the second rate divided by the first rate otherwise. The pull-down module extracts one of x symbols, then one of y symbols, in alternating succession. x is equal to a rounded up division of n by four, and wherein y is equal to a rounded down division of n by four. The first I/O module inserts and removes idle symbols to retain clock synchronization with the first interface.

In other features, a media and speed independent device comprises the RAL module and further comprises a media access controller (MAC) that communicates with the RAL module. A physical extension module communicates with the RAL module and with the external device using a physical extension interface. The physical extension interface includes a 10 Gbps attachment unit interface (XAUI) and the physical extension module includes a 10 Gbps media independent interface (XGMII) extender sublayer (XGXS) module. The physical extension interface is bidirectional serial and the physical extension module includes a 10 Gbps BASE-R (10 GBASE-R) module. The MAC communicates with the RAL module using extended XGMII (EXGMII).

In still other features, a media and speed independent device comprises the RAL module and further comprises a physical layer device (PHY) that communicates with the RAL module. A physical extension module communicates with the RAL module and with the external device using a physical extension interface. The physical extension interface includes a 10 Gbps attachment unit interface (XAUI) and the physical extension module includes a 10 Gbps media independent interface (XGMII) extender sublayer (XGXS) module. The physical extension interface is bidirectional serial and the physical extension module includes a 10 Gbps BASE-R (10 GBASE-R) module. The PHY communicates with the RAL module using EXGMII.

A method for operating a rate adaptation layer (RAL) module comprises providing a first interface operating at a first rate and a second interface operating at a second rate; providing first and second input/output (I/O) modules that communicate with the first and second interfaces, respectively; receiving symbols from the first I/O module; transmitting the symbols n times to the second I/O module, where n is determined by the first and second rates; and selectively extracting symbols to be communicated to the first I/O module.

In other features, the second rate is greater than or equal to the first rate. The first rate is one of 10 Mbps, 100 Mbps, 1 Gbps, and 10 Gbps. The second rate is 10 Gbps. The method includes striping repeated symbols across four lanes. The method includes beginning striping symbols in one of the four lanes. The method includes communicating a start symbol to the second I/O module to indicate a packet beginning; and communicating a terminate symbol to the second I/O module to indicate a packet ending. In other features, the method includes communicating data symbols and the start and terminate symbols to the second interface. The method includes replacing a data symbol communicated from the repeater module to the second I/O module with the start symbol. The method includes striping repeated symbols across four lanes. The method includes selectively deactivating at least one of the four lanes to save power. The method includes selectively deactivating three of the four lanes. The method includes selectively deactivating the at least one of the four lanes when the first rate is less than the second rate.

In other features, the method includes selectively inserting idle symbols before the terminate symbol to align the terminate and start symbols on the same one of the four lanes. The method includes selectively replacing symbols received from the first I/O module before they are passed to the repeater module. The method includes replacing a carrier extend symbol with an idle symbol; and replacing a carrier extend/error symbol with a symbol error. n is equal to the second rate divided by the first rate. The method includes selectively replacing each four-bit nibble received from the first I/O module with a byte comprising two copies of the nibble before passing the byte to the repeater module. The method includes extracting one of x symbols, then one of y symbols, in alternating succession. x is equal to a rounded up division of n by four, and wherein y is equal to a rounded down division of n by four. The method includes inserting and removing idle symbols to retain clock synchronization with the first interface.

A rate adaptation layer (RAL) module for converting from a first interface operating at a first rate to a second interface operating at a second rate comprises first and second input/output (I/O) means for communicating with the first and second interfaces, respectively. Repeater means receives symbols from the first I/O means and transmits the symbols n times to the second I/O means, where n is determined by the first and second rates. Pull-down means receives symbols from the second I/O means and selectively extracts symbols to be communicated to the first I/O means.

In other features, the second rate is greater than or equal to the first rate. The first rate is one of 10 Mbps, 100 Mbps, 1 Gbps, and 10 Gbps. The second rate is 10 Gbps. The repeater means stripes repeated symbols across four lanes. The repeater means begins striping symbols in one of the four lanes. Delimiter injection means communicates a start symbol to the second I/O means to indicate a packet beginning, and communicates a terminate symbol to the second I/O means to indicate a packet ending. The second I/O means communicates data symbols and the start and terminate symbols to the second interface. The delimiter injection means replaces a data symbol communicated from the repeater means to the second I/O means with the start symbol.

In other features, the repeater means stripes repeated symbols across four lanes. At least one of the four lanes are selectively deactivated to save power. Three of the four lanes are selectively deactivated. The at least one of the four lanes are deactivated when the first rate is less than the second rate.

The delimiter injection means selectively inserts idle symbols before the terminate symbol to align the terminate and start symbols on the same one of the four lanes. Carrier extend substitution means selectively replaces symbols received from the first I/O means before they are passed to the repeater means. The carrier extend substitution means replaces a carrier extend symbol with an idle symbol, and replaces a carrier extend/error symbol with a symbol error. n is equal to the second rate divided by the first rate.

In other features, nibble replicating means for selectively replacing each four-bit nibble received from the first I/O means with a byte comprising two copies of the nibble, before passing the byte to the repeater means. The nibble replicator means is enabled when the first rate is equal to one of 10 Mbps and 100 Mbps. n is equal to the second rate divided by twice the first rate when the nibble replicator means is enabled, and equal to the second rate divided by the first rate otherwise. The pull-down means extracts one of x symbols, then one of y symbols, in alternating succession. x is equal to a rounded up division of n by four, and wherein y is equal to a rounded down division of n by four. The first I/O means inserts and removes idle symbols to retain clock synchronization with the first interface.

In other features, a media and speed independent device comprising the RAL module of and further comprises media access controller (MAC) means for communicating with the RAL means. Physical extension means communicates with the RAL means and the external device using a physical extension interface. The physical extension interface includes a 10 Gbps attachment unit interface (XAUI) and the physical extension means includes a 10 Gbps media independent interface (XGMII) extender sublayer (XGXS) module. The physical extension interface is bidirectional serial and the physical extension means includes a 10 Gbps BASE-R (10 GBASE-R) module. The MAC means communicates with the RAL means using extended XGMII (EXGMII).

In still other features, a media and speed independent device comprising the RAL module and further comprises physical layer (PHY) means for communicating with the RAL module. Physical extension means communicates with the RAL module and with the external device using a physical extension interface.

In other features, the physical extension interface includes a 10 Gbps attachment unit interface (XAUI) and the physical extension means includes a 10 Gbps media independent interface (XGMII) extender sublayer (XGXS) module. The physical extension interface is bidirectional serial and the physical extension means includes a 10 Gbps BASE-R (10 GBASE-R) module. The PHY means communicates with the RAL means using EXGMII.

A media and speed independent system for transmitting Ethernet data comprises a media access controller (MAC) and a first rate adaptation layer (RAL) module that communicates with the MAC. A first physical extension module communicates with the first RAL module. A second physical extension module communicates with the first physical extension module using a physical extension interface. A second RAL module communicates with the second physical extension module. A physical layer device (PHY) communicates with the second RAL module.

In other features, the physical extension interface includes a 10 Gbps attachment unit interface (XAUI) and the first and second physical extension modules include 10 Gbps media independent interface (XGMII) extender sublayer (XGXS) modules. The physical extension interface includes bidirectional serial and the first and second physical extension modules include 10 Gbps BASE-R (10 GBASE-R) modules. The MAC communicates with the first RAL module using extended XGMII (EXGMII), and the PHY communicates with the second RAL module using EXGMII.

A media and speed independent device for transmitting Ethernet data to an external device comprises a media access controller (MAC) and a rate adaptation layer (RAL) module that communicates with the MAC. A physical extension module communicates with the RAL module and with the external device using a physical extension interface.

In other features, the physical extension interface includes a 10 Gbps attachment unit interface (XAUI) and the physical extension module includes a 10 Gbps media independent interface (XGMII) extender sublayer (XGXS) module. The physical extension interface includes bidirectional serial and the physical extension module includes a 10 Gbps BASE-R (10 GBASE-R) module. The MAC communicates with the RAL module using extended XGMII (EXGMII).

A media and speed independent system for transmitting Ethernet data comprises media access controller (MAC) means for providing a first interface. First rate adaptation layer (RAL) means communicates with the MAC means. First physical extension means communicates with the first RAL means. Second physical extension means communicates with the first physical extension means using a physical extension interface. Second RAL means communicates with the second physical extension means. Physical layer (PHY) means communicates with the second RAL means and a medium.

In other features, the physical extension interface includes a 10 Gbps attachment unit interface (XAUI) and the first and second physical extension means include 10 Gbps media independent interface (XGMII) extender sublayer (XGXS) modules. The physical extension interface includes bidirectional serial and the first and second physical extension means include 10 Gbps BASE-R (10 GBASE-R) modules. The MAC means communicates with the first RAL means using extended XGMII (EXGMII), and the PHY means communicates with the second RAL means using EXGMII.

A media and speed independent device for transmitting Ethernet data to an external device comprises media access controller (MAC) means for providing an interface. Rate adaptation layer (RAL) means communicates with the MAC means. Physical extension means communicates with the RAL means and with the external device using a physical extension interface.

In other features, the physical extension interface includes a 10 Gbps attachment unit interface (XAUI) and the physical extension means includes a 10 Gbps media independent interface (XGMII) extender sublayer (XGXS) module. The physical extension interface includes bidirectional serial and the physical extension means includes a 10 Gbps BASE-R (10 GBASE-R) module. The MAC means communicates with the RAL means using extended XGMII (EXGMII).

A method for operating a media and speed independent system for transmitting Ethernet data comprises providing a media access controller (MAC); providing a first rate adaptation layer (RAL) module that communicates with the MAC; providing a first physical extension module that communicates with the first RAL module; providing a second physical extension module that communicates with the first physical extension module using a physical extension interface; providing a second RAL module that communicates with the second physical extension module; and providing a physical layer device (PHY) that communicates with the second RAL module.

In other features, the physical extension interface includes a 10 Gbps attachment unit interface (XAUI) and the first and second physical extension modules include 10 Gbps media independent interface (XGMII) extender sublayer (XGXS) modules. The physical extension interface is bidirectional serial and the first and second physical extension modules include 10 Gbps BASE-R (10 GBASE-R) modules. The method includes using extended XGMII (EXGMII) for communication between the MAC and the first RAL module; and using EXGMII for communication between the PHY and the second RAL module.

A method for operating a media and speed independent device for transmitting Ethernet data to an external device comprises providing a media access controller (MAC); providing a rate adaptation layer (RAL) module that communicates with the MAC; and providing a physical extension module that communicates with the RAL module and that communicates with the external device using a physical extension interface.

In other features, the physical extension interface is a 10 Gbps attachment unit interface (XAUI) and the physical extension module is a 10 Gbps media independent interface (XGMII) extender sublayer (XGXS) module. The physical extension interface is bidirectional serial and the physical extension module includes a 10 Gbps BASE-R (10 GBASE-R) module. The method includes using extended XGMII (EXGMII) for communication between the MAC and the RAL module.

A media and speed independent device for transmitting Ethernet data to an external device comprises a physical layer device (PHY) and a rate adaptation layer (RAL) module that communicates with the PHY. A physical extension module communicates with the RAL module and with the external device using a physical extension interface.

In other features, the physical extension interface is a 10 Gbps attachment unit interface (XAUI) and the physical extension module is a 10 Gbps media independent interface (XGMII) extender sublayer (XGXS) module. The physical extension interface is bidirectional serial and the physical extension module is a 10 Gbps BASE-R (10 GBASE-R) module. The PHY communicates with the RAL module using EXGMII.

A media and speed independent means for transmitting Ethernet data to an external device comprises physical layer (PHY) means for providing an interface to a medium. Rate adaptation layer (RAL) means communicates with the PHY means. Physical extension means communicates with the RAL means and with the external device using a physical extension interface.

In other features, the physical extension interface includes a 10 Gbps attachment unit interface (XAUI) and the physical extension means includes a 10 Gbps media independent interface (XGMII) extender sublayer (XGXS) module. The physical extension interface includes bidirectional serial and the physical extension means includes a 10 Gbps BASE-R (10 GBASE-R) module. The PHY communicates with the RAL means using EXGMII.

A method for communicating network data of varying speeds comprises establishing a plurality of signal interconnections; defining a first mapping of XGMII signals onto the plurality of signal interconnections; defining a second mapping of GMII signals onto the plurality of signal interconnections; and defining a third mapping of MII signals onto the plurality of signal interconnections.

In other features, the first mapping is a one to one mapping. The plurality of signal interconnections includes a transmit set of signal interconnections and a receive set of signal interconnections. The first, second, and third mappings include mapping transmit data signals to a set of the data signal interconnections of the transmit set. The first, second, and third mappings include mapping receive data signals to a set of the data signal interconnections of the receive set. The first, second and third mappings include mapping transmit control signals to a set of control signal interconnections of the transmit set. The first, second and third mappings include mapping receive control signals to a set of control signal interconnections of the receive set. The first, second and third mappings include mapping a receive clock signal to a clock signal interconnection of the receive set. The first and second mappings involve mapping a transmit clock signal to a clock signal interconnection of the transmit set. The third mapping involves mapping a transmit clock signal to the clock signal interconnection of the transmit set. The third mapping involves mapping a transmit clock signal to one of the data signal interconnections of the receive set.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a block diagram of system employing a 10 Gbps media independent interface (XGMII) according to the prior art;

FIG. 2 is a block diagram of a system according to the prior art contains a switch and a PHY module;

FIG. 3 is a block diagram of a system using a serial link to connect a switch and PHY;

FIG. 4 is a mapping table of MII, GMII, and XGMII signals onto EXGMII pins;

DETAILED DESCRIPTION OF THE PREFERRED EMBODIMENTS

Figure 5:
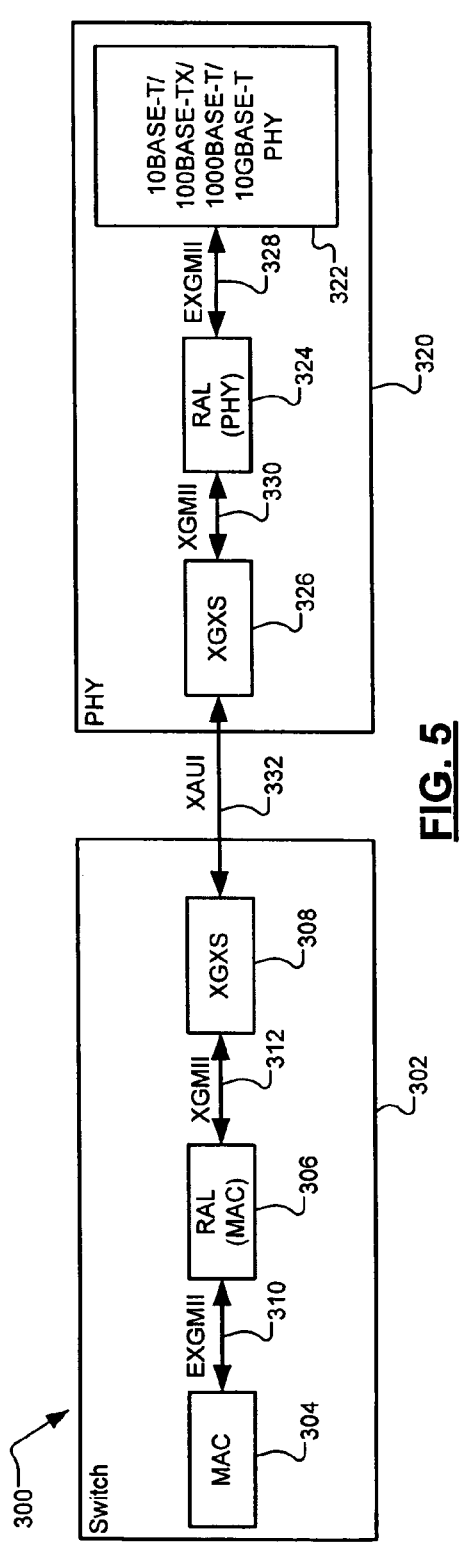
FIG. 5 is a block diagram of a system having an exemplary speed and media independent interface.

The following description of the preferred embodiments is merely exemplary in nature and is in no way intended to limit the invention, its application, or uses. For purposes of clarity, the same reference numbers will be used in the drawings to identify similar elements. As used herein, the term module, controller and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 3, a system 160 according to the present invention that uses a serial link to connect a switch and PHY is illustrated. A MAC 162 within a switch 164 communicates with a 10 Gbps base R (10 GBASE-R) module 166 via first XGMII link 168. The 10 GBASE-R module 166 communicates with a second 10 GBASE-R module 170 via a serial link 172. The second 10 GBASE-R module 170 is located within a PHY module 174 and communicates with a 10 Gbps PHY 176 via a second XGMII link 178. This system 160 essentially uses a 10 Gbps serial Ethernet connection between the switch 164 and the PHY module 174. Although the serial link does not afford much greater distance than an XGMII link, the PHY module 174 can be used to convert between electrical and optical media.

Because many MACs and PHYs are capable of supporting different speeds, it would be advantageous for the media independent interface (MII) to also be speed independent so that the same MII could be used regardless of the speed of the MAC or of the PHY. Additionally, it would be beneficial for the design of the XGXS and the XAUI to remain unchanged and yet still transmit data at any speed supported by the MAC and the PHY.

A media independent interface (MII) is defined for transmitting 10 Mbps data and 100 Mbps data. A 1 Gbps MII (GMII) is defined to transmit 1 Gbps Ethernet data, and a 10 Gbps MII (XGMII) is defined to transmit 10 Gbps Ethernet data. Using three separate MIIs to support transmission of the four speeds of Ethernet data is redundant. To reduce this waste, an extended XGMII (EXGMII) has been developed. In some implementations, the EXGMII uses the same number of signal interconnections (pins, traces, etc.) as XGMII, and accommodates XGMII, GMII, and MII.

Referring now to FIG. 4, a mapping of MII, GMII, and XGMII signals onto EXGMII pins is shown. A mapping table 200 contains six columns. A first column 202 lists EXGMII pin names. A second column 204 specifies the transmission direction with respect to the PHY. A third column 206 specifies the XGMII signals that map to the corresponding EXGMII pin, which is indicated in the first column 202. A fourth column 208 specifies the GMII signals that map to the corresponding EXGMII pin, which is indicated in the first column 202. A fifth column 210 specifies the MII signals that map to the corresponding EXGMII pin, which is indicated in the first column 202. A sixth column 212 specifies an alternative mapping of MII signals to EXGMII pins. The alternative mapping in the sixth column 212 allows the transmit direction to be source-synchronous by making TX_CLK an input to the PHY (providing the clock for the input TXD data signals).

Referring now to FIG. 5, a system 300 having an exemplary speed and media independent interface is depicted. A switch 302 includes a media access controller (MAC) 304, a MAC rate adaptation layer (RAL) 306, and a first XGMII extender sublayer (XGXS) module 308. The MAC 304 communicates with the MAC RAL 306 via an EXGMII link 310. The MAC RAL 306 communicates with the first XGXS module 308 via an XGMII link 312. A physical layer device (PHY) 320 module contains a multispeed PHY 322, a PHY rate adaptation layer (RAL) 324, and a second XGXS module 326. The PHY 322 communicates with the PHY RAL 324 via an EXGMII link 328. The PHY RAL 324 communicates with the second XGXS module 326 via an XGMII link 330.

The first and second XGXS modules, 308 and 326, communicate via a 10 Gbps Attachment Unit Interface (XAUI) 332. While the PHY 322 and the MAC 304 can operate at a number of speeds (including 10 Mbps, 100 Mbps, 1 Gbps, and 10 Gbps), the XGXS modules, 308 and 326, and the XAUI link 332 operate at 10 Gbps. The RALs 306 and 324 convert from the line speed to 10 Gbps. In this way the XGXS modules and the XAUI protocol can be used without redesign.

Figure 6:
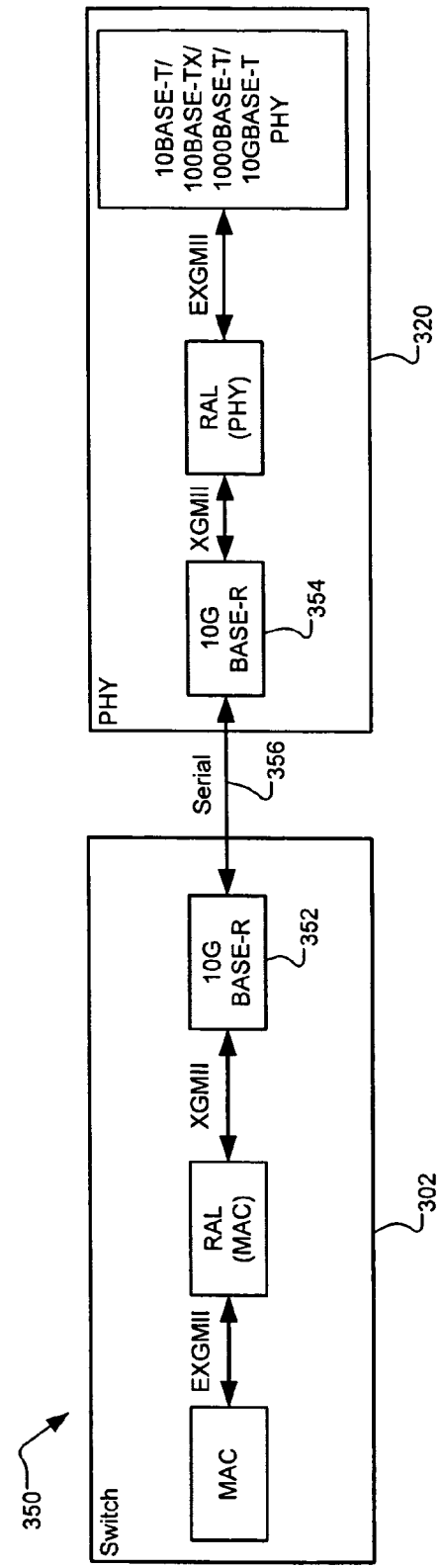
FIG. 6 is a block diagram of an alternative system using another exemplary interconnection according to the principals of the present invention.

Referring now to FIG. 6, a block diagram of an alternative system 350 using another exemplary interconnection according to the principals of the present invention is depicted. The alternative system 350 is the same as the system 300 of FIG. 5, except that the XGXS modules, 308 and 326, have been replaced with 10 Gbps BASE-R (10 GBASE-R) modules, 352 and 354, which communicate via a serial link 356. The 10 GBASE-R modules, 352 and 354, essentially form a 10 Gbps Ethernet link between the switch 302 and PHY module 320.

Figure 7:
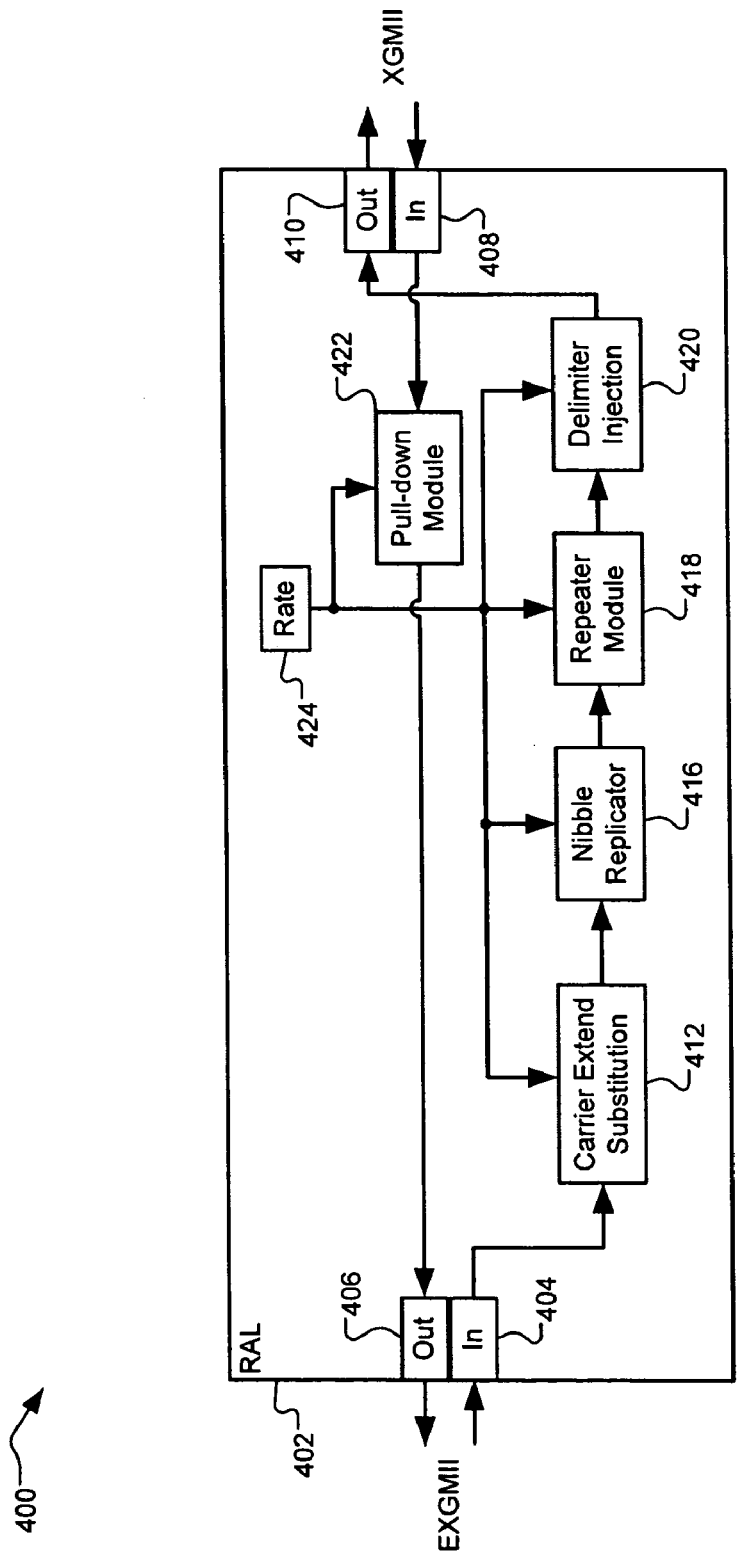
FIG. 7 is a block diagram of an exemplary implementation of a rate adaptation layer (RAL) module.

Referring now to FIG. 7, a block diagram of an exemplary implementation of a rate adaptation layer (RAL) module is depicted. A system 400 includes a RAL module 402 that communicates on one side with EXGMII and on the other with XGMII. A first input module 404 and a first output module 406 communicate with EXGMII. A second input module 408 and a second output module 410 communicate with XGMII. The first input module 404 communicates with a carrier extend substitution module 412. The carrier extend substitution module 412 communicates an output to a nibble replicator 416. The nibble replicator 416 communicates an output to a repeater module 418. The repeater module 418 communicates an output to a delimiter injection module 420. The delimiter injection module 420 communicates an output to the second output module 410.

The second input module 408 communicates with a pull-down module 422. The pull-down module 422 communicates an output to the first output module 406. A data rate value 424 is communicated to the carrier extend substitution module 412, the nibble replicator 416, the repeater module 418, the delimiter injection module 420, and the pull-down module 422.

The carrier extend substitution module 412 operates when the rate 424 is 1 Gbps. When operating, the carrier extend substitution module 412 replaces a carrier extend symbol received from the first input module 404 with an idle symbol, and replaces a carrier extend/error symbol with a symbol error. Otherwise, the carrier extend substitution module 412 passes symbols unchanged. The nibble replicator 416 is enabled when the rate 424 is either 10 Mbps or 100 Mbps. When enabled, the nibble replicator 416 takes each received 4-bit nibble and duplicates it to form a byte. For example, a nibble 1011 will become the byte 10111011.

The repeater module 418 is inactive (pass-through) when the rate 424 is 10 Gbps. When the rate 424 is 1 Gbps, the repeater module 418 will repeat each received 8-bit data symbol ten times. The way in which these repeated symbols are transmitted to the delimiter injection module 420 is discussed below in conjunction with FIGS. 8 through 10. When the rate 424 is 100 Mbps, the repeater module 418 repeats each byte fifty times. When the rate 424 is 10 Mbps, the repeater module 418 repeats each byte five hundred times. The repeated symbols that the repeater module 418 produces are striped across four lanes as XGMII specifies. As with the repeater module 418, the delimiter injection module 420 operates when the rate 424 is not 10 Gbps. The delimiter injection module 420 places a /S/ start symbol on lane zero at the beginning of a packet, and a /T/ terminate symbol on lane zero immediately after the end of a packet. Any bytes between the end of the packet and the concluding /T/ symbol are filled with a pad byte.

The first and second input modules, 404 and 408, and first and second output modules, 406 and 410, can be responsible for inserting and removing idle symbols to match internal clock rates with that of the XGMII and EXGMII links. FIFO (first-in first-out) buffers used for inserting and removing idle symbols can be made smaller when only the first input module 404 and the first output module 406 are responsible for idle insertion and removal. The pull-down module 422 operates when the rate 424 is not 10 Gbps. The operation of the pull-down module 422 will become more clear after FIGS. 8 through 10 are discussed.

Figure 8:
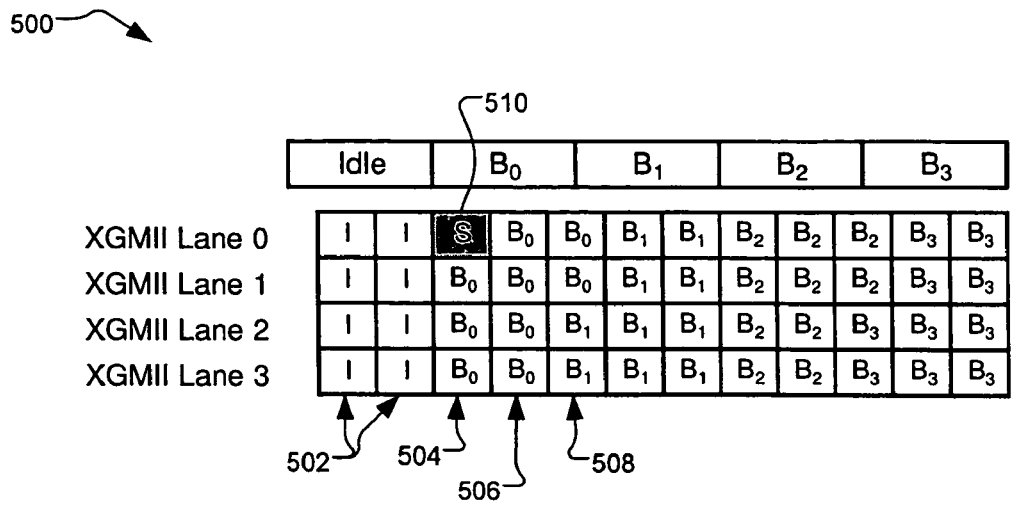
FIG. 8 is a graphical depiction of exemplary byte striping across XGMII lanes.

Referring now to FIG. 8, a graphical depiction 500 of exemplary byte striping across XGMII lanes is presented. Four XGMII lanes are numbered 0 through 3. Idles 502 appear before the beginning of a packet. This example is for an EXGMII link operating at 1 Gbps, and so bytes are repeated ten times. Bytes are striped, beginning with lane 0 and progressing through lane 3. For example, byte 0 (denoted $B_0$) starts in column 504, and continues through column 506 and half of column 508, where the next ten replicated bytes ($B_1$) begin. The first instance of $B_0$ (the start of a packet) is replaced with the /S/ start symbol 510 (shown shaded). Striping for a packet begins on lane 0, and so the /S/ symbol will always occur on lane 0. Inspecting lane 0 by itself, it can be seen that bytes are presented in a 3-2-3-2 order. This is because four divides into ten 2.5 times. In order to decode the byte striping, only lane 0 need be inspected, and 1 byte selected from each of the 3- or 2-byte groups.

Figure 9:
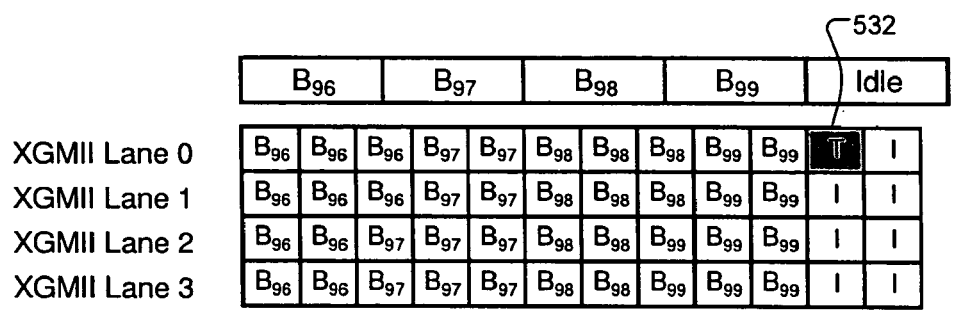
FIG. 9 is a table depicting byte striping on XGMII at the end of a packet.

FIG. 9 is a table 530 depicting byte striping on XGMII at the end of a packet. The example of table 530 is also for a 1 Gbps EXGMII rate, and in this table the number of bytes in the packet is even. This means that a /T/ terminate symbol 532 placed after the last byte of the packet will naturally fall on lane 0. The remaining three lanes are filled with idle symbols.

Figure 10:
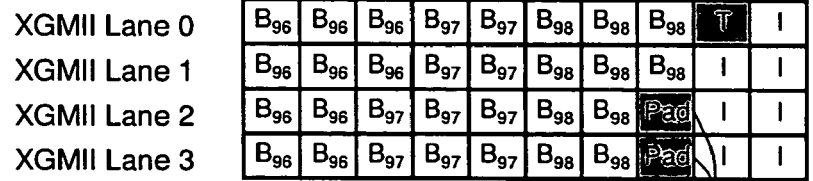
FIG. 10 is a table depicting byte striping across XGMII at the end of an alternate packet.

Referring now to FIG. 10, a table 560 depicts byte striping across XGMII at the end of an alternative packet. Here, the EXGMII rate is still 1 Gbps, but the number of bytes in the packet is odd. With an odd number of packets, a /T/ terminate symbol placed at the end of the data bytes will naturally fall in lane 2. For ease of recovery, however, the /T/ terminate symbol should be placed on lane 0. To this end, two pad symbols 562 are inserted on lanes 2 and 3, which then causes the /T/ terminate symbol 564 to fall on lane 0. As can be seen, the bytes of a packet can be decoded by looking only at lane 0. This means that lanes 1 through 3 may be turned off to save power when not operating at 10 Gbps.

Returning now to FIG. 7, operation of the pull-down module 422 is more clear. The pull-down module 422 simply passes data through when the rate 424 is 10 Gbps. When the rate 424 is 1 Gbps, the pull-down module 422 extracts from XGMII lane 0 one of three bytes, one of two bytes, one of three bytes, one of two bytes, and so on. When the rate 424 is 100 Mbps, recall that bytes were replicated fifty times. Four divides into fifty 12.5 times, and therefore the pulldown module 422 will extract one of thirteen bytes, one of twelve bytes, one of thirteen bytes, one of twelve bytes, and so on. In 10 Mbps mode, recall that bytes were replicated five hundred times. Four divides evenly into five hundred 125 times, and therefore the pull-down module 422 extracts one byte out of every 125 bytes received.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A rate adaptation layer (RAL) module for converting from a first interface operating at a first rate to a second interface operating at a second rate, comprising:
   first and second input/output (I/O) modules that communicate with the first and second interfaces, respectively;
   a repeater module that receives symbols from said first I/O module, and transmits said symbols n times to said second I/O module, where n is determined by the first and second rates;
   a pull-down module that receives symbols from said second I/O module, and selectively extracts symbols to be communicated to said first I/O module; and
   a delimiter injection module that communicates a start symbol to said second I/O module to indicate a packet beginning and communicates a terminate symbol to said second I/O module to indicate a packet ending, wherein said delimiter injection module replaces a data symbol communicated from said repeater module to said second I/O module with said start symbol.

2. A rate adaptation layer (RAL) module for converting from a first interface operating at a first rate to a second interface operating at a second rate, comprising:
   first and second input/output (I/O) modules that communicate with the first and second interfaces, respectively;
   a repeater module that receives symbols from said first I/O module, and transmits said symbols n times to said second I/O module, where n is determined by the first and second rates, wherein said repeater module stripes repeated symbols across four lanes;
   a pull-down module that receives symbols from said second I/O module, and selectively extracts symbols to be communicated to said first I/O module; and
   a delimiter injection module that communicates a start symbol to said second I/O module to indicate a packet beginning and communicates a terminate symbol to said second I/O module to indicate a packet ending, wherein said delimiter injection module selectively inserts idle symbols before said terminate symbol to align said terminate and start symbols on the same one of said four lanes.

3. The RAL module of claim 2 wherein at least one of said four lanes are selectively deactivated to save power.

4. The RAL module of claim 3 wherein three of said four lanes are selectively deactivated.

5. The RAL module of claim 3 wherein said at least one of said four lanes are deactivated when the first rate is less than the second rate.

6. A rate adaptation layer (RAL) module for converting from a first interface operating at a first rate to a second interface operating at a second rate, comprising:
   first and second input/output (I/O) modules that communicate with the first and second interfaces, respectively;
   a repeater module that receives symbols from said first I/O module, and transmits said symbols n times to said second I/O module, where n is determined by the first and second rates;
   a pull-down module that receives symbols from said second I/O module, and selectively extracts symbols to be communicated to said first I/O module; and
   a carrier extend substitution module that selectively replaces symbols received from said first I/O module before said symbols are passed to said repeater module.

7. The RAL module of claim 6 wherein said carrier extend substitution module replaces a carrier extend symbol with an idle symbol, and replaces a carrier extend/error symbol with a symbol error.

8. A rate adaptation layer (RAL) module for converting from a first interface operating at a first rate to a second interface operating at a second rate, comprising:
   first and second input/output (I/O) modules that communicate with the first and second interfaces, respectively;
   a repeater module that receives symbols from said first I/O module, and transmits said symbols n times to said second I/O module, where n is determined by the first and second rates;
   a pull-down module that receives symbols from said second I/O module, and selectively extracts symbols to be communicated to said first I/O module; and
   a nibble replicator module that, when enabled, replaces each four-bit nibble received from said first I/O module with a byte comprising two copies of said nibble, before passing said byte to said repeater module.

9. The RAL module of claim 8 wherein said nibble replicator module is enabled when the first rate is equal to one of 10 Mbps and 100 Mbps.

10. The RAL module of claim 8 wherein n is equal to the second rate divided by twice the first rate when said nibble replicator module is enabled, and equal to the second rate divided by the first rate otherwise.

11. A rate adaptation layer (RAL) module for converting from a first interface operating at a first rate to a second interface operating at a second rate, comprising:
   first and second input/output (I/O) modules that communicate with the first and second interfaces, respectively;
   a repeater module that receives symbols from said first I/O module, and transmits said symbols n times to said second I/O module, where n is determined by the first and second rates;
   a pull-down module that receives symbols from said second I/O module, and selectively extracts symbols to be communicated to said first I/O module, wherein said pull-down module extracts one of x symbols, then one of y symbols, in alternating succession, wherein x is equal to a rounded up division of n by four, and wherein y is equal to a rounded down division of n by four.

12. A rate adaptation layer (RAL) module for converting from a first interface operating at a first rate to a second interface operating at a second rate, comprising:
   first and second input/output (I/O) modules that communicate with the first and second interfaces, respectively;
   a repeater module that receives symbols from said first I/O module, and transmits said symbols n times to said second I/O module, where n is determined by the first and second rates;
   a pull-down module that receives symbols from said second I/O module, and selectively extracts symbols to be communicated to said first I/O module, wherein said first I/O module inserts and removes idle symbols to retain clock synchronization with the first interface.

13. A method for operating a rate adaptation layer (RAL) module, comprising:
   providing a first interface operating at a first rate and a second interface operating at a second rate;
   providing first and second input/output (I/O) modules that communicate with the first and second interfaces, respectively;
   receiving symbols from said first I/O module;
   transmitting said symbols n times to said second I/O module, where n is determined by the first and second rates;
   selectively extracting symbols to be communicated to said first I/O module;
   communicating a start symbol to said second I/O module to indicate a packet beginning;

communicating a terminate symbol to said second I/O module to indicate a packet ending; and replacing a data symbol communicated to said second I/O module with said start symbol.

14. A method for operating a rate adaptation layer (RAL) module, comprising:

provoding a first interface operating at a first rate and a second interface operating at a second rate;

providing first and second input/output (I/O) modules that communicate with the first and second interfaces, respectively;

receiving symbols from said first I/O module;

transmitting said symbols n times to said second I/O module, where n is determined by the first and second rates;

selectively extracting symbols to be communicated to said first I/O module;

communicating a start symbol to said second I/O module to indicate a packet beginning;

communicating a terminate symbol to said second I/O module to indicate a packet ending;

striping repeated symbols across four lanes; and selectively inserting idle symbols before said terminate symbol to align said terminate and start symbols on the same one of said four lanes.

15. The method of claim 14 further comprising selectively deactivating at least one of said four lanes to save power.

16. The method of claim 15 further comprising selectively deactivating three of said four lanes.

17. The method of claim 15 further comprising selectively deactivating said at least one of said four lanes when the first rate is less than the second rate.

18. A method for operating a rate adaptation layer (RAL) module, comprising:

providing a first interface operating at a first rate and a second interface operating at a second rate;

providing first and second input/output (I/O) modules that communicate with the first and second interfaces, respectively;

receiving symbols from said first I/O module;

transmitting said symbols n times to said second I/O module, where n is determined by the first and second rates;

selectively extracting symbols to be communicated to said first I/O module;

selectively replacing symbols received from said first I/O module before they are transmitted;

replacing a carrier extend symbol with an idle symbol; and replacing a carrier extend/error symbol with a symbol error.

19. A method for operating a rate adaptation layer (RAL) module, comprising:

providing a first interface operating at a first rate and a second interface operating at a second rate;

providing first and second input/output (I/O) modules that communicate with the first and second interfaces, respectively;

receiving symbols from said first I/O module;

transmitting said symbols n times to said second I/O module, where n is determined by the first and second rates;

selectively extracting symbols to be communicated to said first I/O module; and selectively replacing each four-bit nibble received from said first I/O module with a byte comprising two copies of said nibble before passing said byte to be transmitted.

20. A method for operating a rate adaptation layer (RAL) module, comprising:

providing a first interface operating at a first rate and a second interface operating at a second rate;

providing first and second input/output (I/O) modules that communicate with the first and second interfaces, respectively;

receiving symbols from said first I/O module;

transmitting said symbols n times to said second I/O module, where n is determined by the first and second rates;

selectively extracting symbols to be communicated to said first I/O module; and extracting one of x symbols, then one of V symbols, in alternating succession, wherein x is equal to a rounded up division of n by four, and wherein y is equal to a rounded down division of n by four.

21. A method for operating a rate adaptation layer (RAL) module, comprising:

providing a first interface operating at a first rate and a second interface operating at a second rate;

providing first and second input/output (I/O) modules that communicate with the first and second interfaces, respectively;

receiving symbols from said first I/O module;

transmitting said symbols n times to said second I/O module, where n is determined by the first and second rates;

selectively extracting symbols to be communicated to said first I/O module; and inserting and removing idle symbols to retain clock synchronization with the first interface.

* * * * *